United States Patent
Visvanathan et al.

(10) Patent No.: US 10,474,587 B1
(45) Date of Patent: Nov. 12, 2019

(54) SMART WEIGHTED CONTAINER DATA CACHE EVICTION

(71) Applicant: EMC IP Holding Company LLC, Hopkinton, MA (US)

(72) Inventors: Satish Kumar Kashi Visvanathan, San Jose, CA (US); Rahul Ugale, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 56 days.

(21) Appl. No.: 15/499,606

(22) Filed: Apr. 27, 2017

(51) Int. Cl.
*G06F 12/00* (2006.01)
*G06F 12/122* (2016.01)
*G06F 12/0808* (2016.01)
*G06F 12/128* (2016.01)

(52) U.S. Cl.
CPC ........ *G06F 12/122* (2013.01); *G06F 12/0808* (2013.01); *G06F 12/128* (2013.01); *G06F 2212/621* (2013.01); *G06F 2212/69* (2013.01)

(58) Field of Classification Search
CPC .. G06F 12/122; G06F 12/0808; G06F 12/128; G06F 2212/621; G06F 2212/69
See application file for complete search history.

(56) References Cited

U.S. PATENT DOCUMENTS

| | | | |
|---|---|---|---|
| 6,425,057 B1 | 7/2002 | Cherkasova et al. | |
| 6,701,393 B1 * | 3/2004 | Kemeny | G06F 12/122 710/40 |
| 8,935,446 B1 | 1/2015 | Shilane et al. | |
| 9,189,402 B1 | 11/2015 | Smaldone et al. | |
| 9,189,414 B1 | 11/2015 | Shim et al. | |
| 9,304,914 B1 * | 4/2016 | Douglis | G06F 12/0802 |
| 9,336,143 B1 | 5/2016 | Wallace et al. | |
| 9,390,116 B1 | 7/2016 | Li et al. | |
| 2004/0143707 A1 | 7/2004 | Olarig et al. | |
| 2005/0108189 A1 | 5/2005 | Samsonov | |
| 2009/0182951 A1 | 7/2009 | Matick et al. | |
| 2010/0199036 A1 | 8/2010 | Siewert et al. | |
| 2010/0250890 A1 | 9/2010 | Beckmann et al. | |
| 2011/0066808 A1 | 3/2011 | Lynn et al. | |
| 2011/0179341 A1 | 7/2011 | Falls et al. | |
| 2011/0283065 A1 | 11/2011 | Kurashige | |
| 2013/0036277 A1 | 2/2013 | Szczepkowski et al. | |
| 2013/0304991 A1 | 11/2013 | Bttcher et al. | |
| 2013/0311722 A1 | 11/2013 | Stenstrm | |
| 2014/0006538 A1 | 1/2014 | Oikonomou | |
| 2015/0199138 A1 * | 7/2015 | Ramachandran | G06F 12/122 711/103 |
| 2015/0317083 A1 | 11/2015 | Phan | |
| 2016/0062892 A1 | 3/2016 | Guthrie et al. | |
| 2016/0196214 A1 | 7/2016 | Hooker et al. | |

* cited by examiner

*Primary Examiner* — Gurtej Bansal
(74) *Attorney, Agent, or Firm* — Womble Bond Dickinson (US) LLP

(57) ABSTRACT

Smart weighted container data cache eviction preserves write evict units (WEUs) containing the most frequently and recently accessed blocks to maintain low latency data cache. Prior to performing cache eviction, the WEUs are weighted based on the page statistics maintained for each WEU. Page statistics include page hit/frequency and recency statistics associated with each WEU and data cache eviction is performed at the WEU level of granularity. Therefore, an entire WEU can be evicted based on page hit/frequency and recency statistics associated with the WEU.

20 Claims, 6 Drawing Sheets

SMART WEIGHTED CONTAINER DATA CACHE EVICTION

FIELD OF THE INVENTION

Embodiments of the present invention relate generally to data storage systems. More particularly, embodiments of the invention relate to managing a cache for data storage systems using data cache eviction.

BACKGROUND

Primary storage with integrated protection, referred to as PIP storage, reduces storage costs and reduces the time for backup creation and restoration because of its integrated design. A single PIP storage may utilize any type of non-volatile storage medium such as flash memory, PCIe-connected flash memory, solid state device (SSD), magnetic tape, and magneto-optical (MO) storage media to take advantage of different cost performance characteristics of different non-volatile storage medium.

For example, SSDs can deliver about 500× more input/output operations per second (IOPS) than spinning disk but also have 5× the cost. SSDs, as well as other forms of flash memory, have a limited number of write-erase cycles after which a given region of memory cannot be rewritten.

To obtain the best performance, the architecture of a typical PIP storage system uses a tiered infrastructure, including a larger lower cost and lower performance medium such as hard drive disk storage medium (HDD), and a smaller cache/tier layer of a higher cost and higher performance storage medium (SSD). The challenge is to build the tiered infrastructure economically and with high performance. Typically, HDD is used to provide a bottom layer of large capacity disk storage, and SSD is used to provide a middle layer of cache memory, referred to as data cache.

Data cache accelerates performance, including improving the read latency of primary-like application access in Instant Access/Instant Recovery (IA/IR) use cases. Primary-like application access typically refers to frequent access to approximately 20 percent of data and less frequent access to the remaining 80 percent of data.

Since HDD capacity is bigger than SSD capacity, data cache eviction is crucial to maintain performance of the PIP storage system. Otherwise, bottlenecks in the data cache occur and degrade performance. With smaller SSD capacity, data cache needs to provide high input/output operations per second (IOPS) and low latency. Consequently, on some platforms with low IOPS, it is challenging to support IA/IR use cases.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
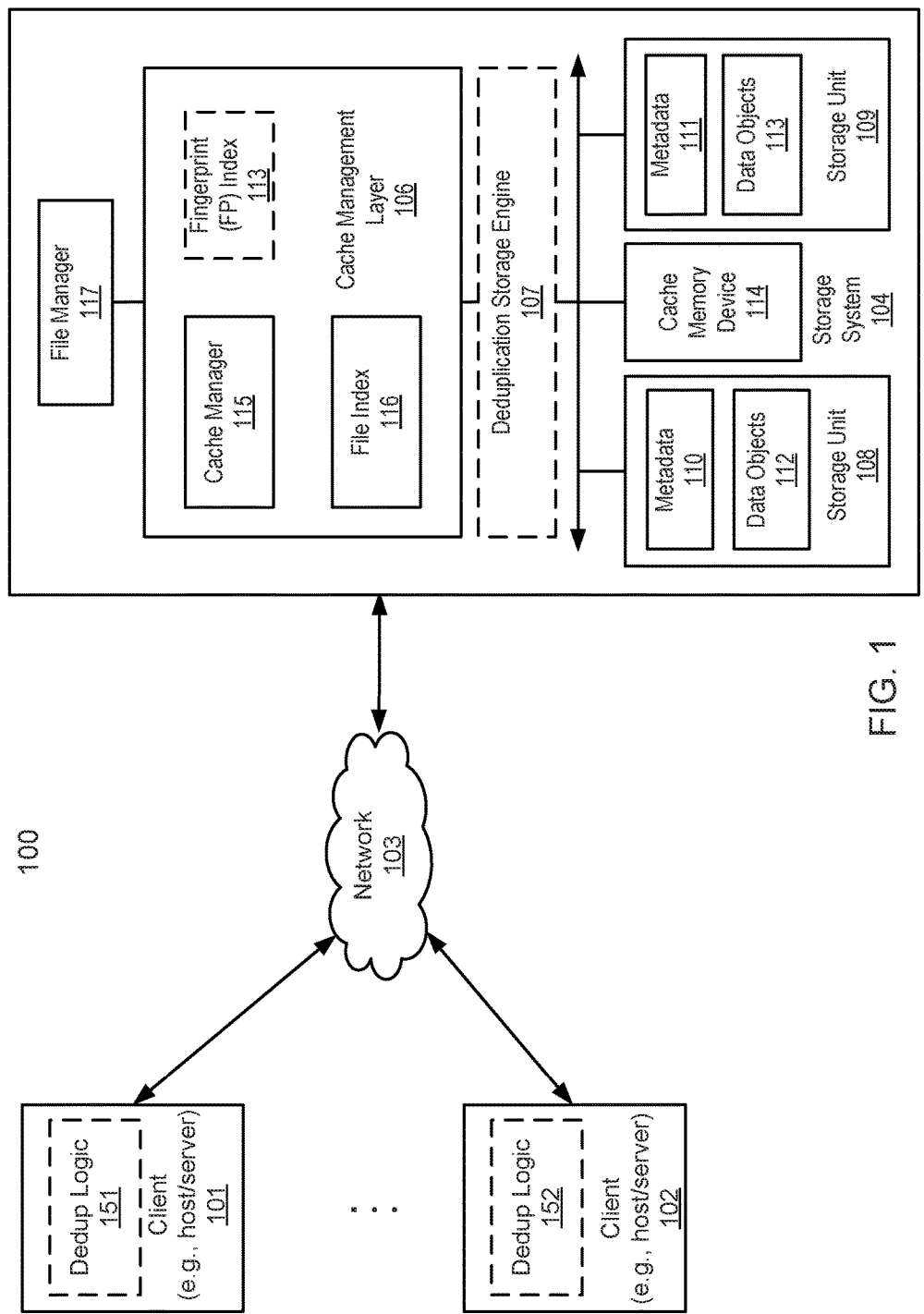
FIG. 1 is a block diagram illustrating a storage system with cache management for data cache eviction according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

As already noted, data cache in PIP storage systems typically use SSD for data cache because it has higher performance than HDD. In particular, HDD offers poor latency of above 10 ms average when the overall IOPS per spindle is only 100-200. This level of latency is not enough to support primary-like workloads. On large platforms with several spindles some of the performance challenges of HDD can be managed to provide latency between 10-15 ms for applications at high IOPS, e.g. 10K. But on smaller platforms with low spindle counts relying on HDD can cause queuing and lead to file operation timeouts. Using SSD for data cache improves IOPS and reduces latency.

Additionally, on systems with high spindle counts, randomized input/output (RIO) can consume a lot of bandwidth preventing Purpose Built Backup Appliance (PBBA) workloads from running efficiently since some resources are needed for RIO. Moving data access to SSD using data cache frees up the HDD resources.

Despite the foregoing advantages, SSD has unique properties that can impact its use as data cache (these techniques/properties also generally apply to any flash-based storage device such as PCIe-based flash devices). For example, an SSD storage unit must be explicitly erased before being overwritten, and the unit of erasure (up to MB(s) in size) is much larger than the unit of individual writes in a disk storage (e.g., 4 kilobytes). In addition, writes wear out the SSD storage over time; therefore, less frequent writing is more desirable.

The challenge to using SSD for data cache is to increase IOPS, lower latency and enable more use cases, even while a backup is running. Efficiently serving the Input/Output demands from SSD improves IOPS and reduces latencies for the IA/IR use cases.

Data cache typically uses a write-evict unit (WEU) as its basic data structure, different from data structures such as the chunks used in an underlying storage system, such as a deduplicated storage system. A WEU is typically formed from multiple (and compressed) extents, which may be comprised of fixed-size blocks representing consecutive bytes (often many kilobytes) within one or more files.

An extent is the access unit size (the unit of read from the cache) that is performed by the cache system in response to a request to access a file block of a file. Extents may be the same as or different from chunks depending on implementation. A block (also referred to as a file block) is a data unit of each request to read or write to the underlying storage system. For example, data requested by a higher file system layer (such as NFS) is in the form of block requests, which are converted to extent requests in the cache, while data being written in a cache memory device is in the form of a WEU.

A WEU typically includes multiple extents, each of which is compressed therein, and from which each extent can be independently read and accessed to satisfy read requests from the higher layers of the file system. The size of a WEU may be configured to match an erasure unit size of a cache memory device to improve its lifespan depending upon its specification or characteristics.

In data cache systems WEUs are evicted to free space to cache WEUs for new requests. But evicting WEUs that contain data to which applications still need access can degrade performance of the PIP storage system.

To overcome this challenge embodiments of a smart weighted container data cache eviction are based on a policy that recognizes that data access typically exhibits a pattern, and following that data access pattern can improve the cache hits and thus improve the performance of data cache in PIP storage systems.

According to one embodiment, embodiments of smart weighted container data cache eviction preserves WEUs containing the most used and recently accessed blocks to provide low latency of access for most accesses.

According to one embodiment, the WEUs are weighted based on the page statistics maintained for each WEU. Page statistics include page hit/frequency and recency statistics associated with each WEU.

According to one embodiment, data cache eviction is performed at the WEU level of granularity. Therefore, an entire WEU can be evicted based on page hit/frequency and recency statistics associated with the WEU.

According to one embodiment, an eviction policy for the smart weighted container data cache eviction is based on pages/blocks that have been added to a WEU temporally. Should a sufficient number of pages/blocks that were added to the WEU temporally are accessed neither frequently nor recently, then an entire WEU can be evicted without significantly impacting the cache performance, i.e. the cache hit rate.

According to one embodiment, the eviction policy for the smart weighted container data cache eviction accounts for current workload and performance characteristics of the data cache. For example, in one embodiment, a smart weighted container data cache eviction process is performed only when sufficient processor capacity is available or when cache hit performance is degraded enough that eviction is needed.

FIG. 1 is a block diagram illustrating a storage system in which smart weighted data cache eviction can be implemented according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of clients 101-102 may be a primary storage system that provides storage to other local clients, which may periodically back up the content stored therein to a backup storage system, such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may be used as any type of server or cluster of servers. For example, storage system 104 may be a storage server used for any of various different purposes, such as to provide multiple users with access to shared data and/or to back up data (e.g., mission critical data). In one embodiment, storage system 104 includes, but is not limited to, file manager 117, cache management layer 106, deduplication storage engine 107, storage units 108-109, and cache memory device (or simply referred to as cache) 114 communicatively coupled to each other. Storage units 108-109 and cache 114 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system. Note the terms "cache memory device" and "cache" are used interchangeably within the specification, and a cache memory device can be volatile or non-volatile devices.

In one embodiment, a processor is configured to execute a file manager 117 to provide an interface to access files stored in storage units 108-109 and cache 114. In one embodiment, a cache management layer 106 is configured with a cache manager 115, file index 116, and optionally fingerprint (FP) index 113. In one embodiment, a processor is configured to execute the cache manager 115 to perform processes for smart weighted container data cache eviction. Cache management layer 106 and file manager 117 reside in memory of a processor in one embodiment.

In one embodiment, file index 116 is used to access data cached in cache memory device 114. Fingerprint index 113 is used to deduplicate the data stored in cache memory device 114. When data such as data objects 112-113 is accessed in the underlying storage system, the data may be cached in cache memory device 114, in this example, a non-volatile memory device such as a solid state drive (SSD) or other flash memory device. In response to receiving a request to cache a file extent of a file, its fingerprint is generated and used by cache manager 115 to look up in the fingerprint index 113 to determine whether any fingerprint entry matching the fingerprint is found. If so, that means the corresponding data has already been stored in the cache memory device 114 as a file extent. The file is associated with the storage location that caches the file extent by creating or inserting a file extent entry into the file index 116.

According to one embodiment of the invention, the fingerprint index 113 is a partial index that only covers portions of the file extents stored in the cache memory device 114. An efficient insertion and eviction mechanism is employed to maintain the fingerprint index in a relatively small size. A variety of replacement policies can be utilized to determine which of the file fingerprint entries should be inserted or evicted from the fingerprint index 113.

According to one embodiment, the cache management layer 106 uses other insertion and eviction policies to determine which file extents should be kept in the cache and referenced by the file index 116. In one embodiment, each of the file extent entries in the file index 116 may be associated with a list of one or more linked nodes that collectively represent a file extent. Each node includes a bitmap having multiple bits, each corresponding to one of the data blocks within the corresponding extent associated with the node. The bitmap is to indicate which of the data blocks within the file extent are valid.

According to another embodiment of the invention, some of the fingerprints of the underlying deduplicated storage system (e.g., fingerprints as part of metadata 110-111) are shared with and utilized by the fingerprint index 113 of the cache management layer 106.

According to one embodiment, the file extents cached in the cache memory device 114 are compressed into a WEU together with some other file extents from the same file or different files. The WEU is then stored in the cache memory device and evicted in accordance with embodiments of smart weighted container data cache eviction as described herein.

In one embodiment, the size of a WEU may match an erasure unit size of that particular cache memory device 114. When storing data into the cache memory device 114, an entire WEU is written or evicted to improve the lifespan of the cache memory device 114, and to improve data cache performance in accordance with embodiments of smart weighted container cache eviction as described herein.

In one embodiment, when accessing data stored in the cache memory device 114, a file extent is read. In some embodiments, a file extent is significantly smaller than a WEU, which reduces the amount of excess data read to satisfy a request. In some embodiments, a file extent is the unit of compression so that only a file extent needs to be read in order to decompress and return the requested data that is part of that file extent.

In one embodiment, referring back to FIG. 1, any of clients 101-102 may further include an optional deduplication logic (e.g., deduplication logic 151-152) having at least a portion of functionalities of deduplication logic 107. Deduplication logic 151-152 is configured to perform local deduplication operations, respectively. For example, prior to transmitting data to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

The operations of storing file data in the cache memory device 114 are discussed in detail herein below. For storing file data in storage units 108-109, deduplication storage engine 107 is configured to segment the file data into multiple chunks (also referred to as segments) according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of file data are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of all storage units associated with the storage system in the event that the main metadata is lost, corrupted, damaged, etc. Metadata for a storage unit can be reconstructed using metadata information stored on a main storage unit or other storage unit or units (e.g., replica storage unit). Metadata information further includes index information (e.g., location information for segments in storage units). In one embodiment, metadata includes prime segment information that can be used to provide a consistent point of a file system and/or reconstruct a file system in the event of file system failure.

In one embodiment, storage system 104 further includes a storage manager or storage controller (not shown) configured to manage storage resources of storage system 104, such as, for example, storage space and processing resources (e.g., processor, memory, network resources). An administrator of management console or server may access the storage manager or controller remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

Figure 2:
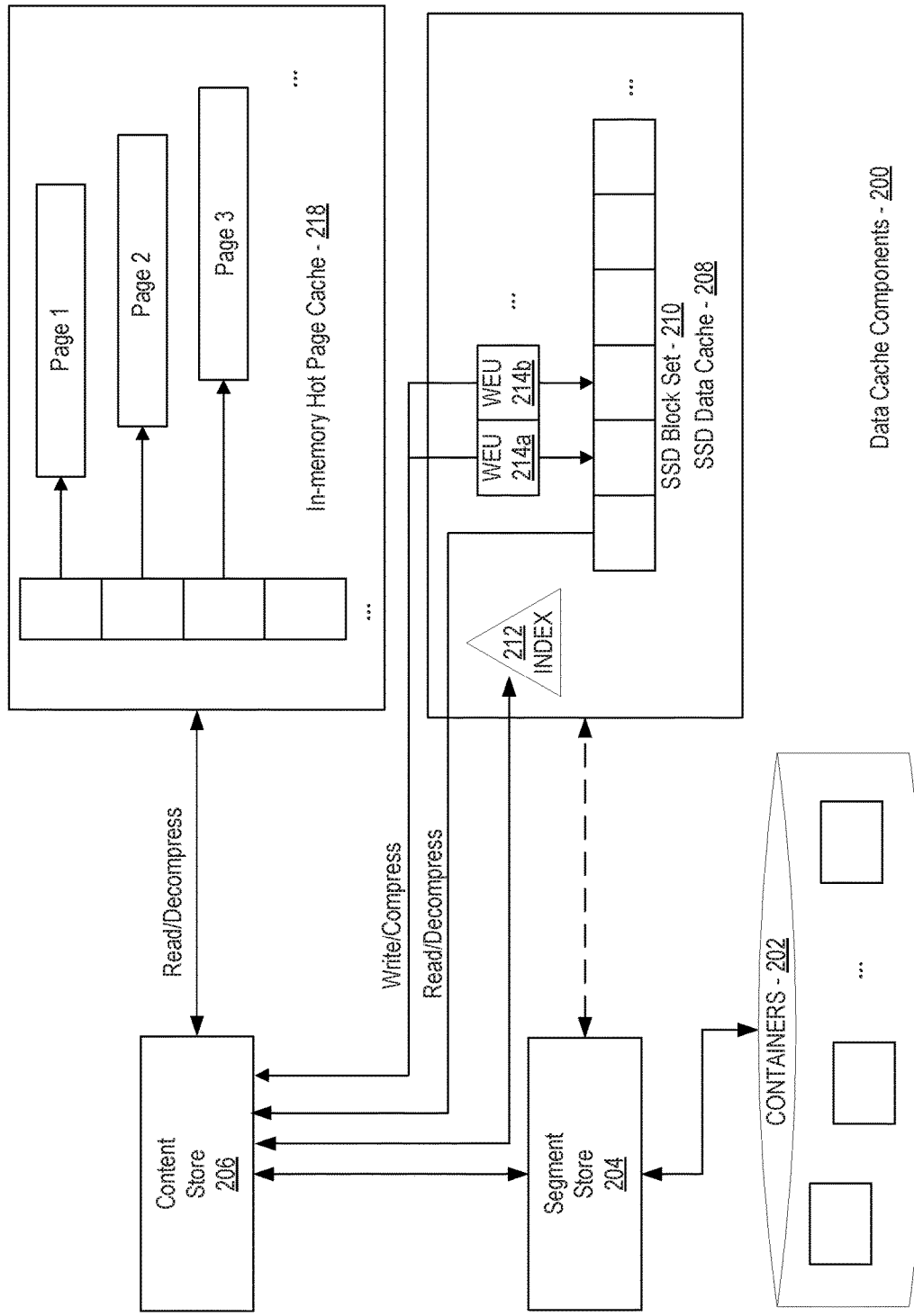
FIG. 2 is a block diagram illustrating data cache components of a storage system with cache management for data cache eviction in further detail according to one embodiment of the invention.

FIG. 2 is a block diagram illustrating further details of storage system 104 (FIG. 1), including the data cache components 200 for providing embodiments of smart weighted container cache eviction.

In one embodiment, data stored in containers 202 in HDD storage units, such as deduplicated data, are accessed through operations of a segment store 204 and a content store 206. To improve performance, data obtained from containers 202 in the data store are cached in an SSD data cache 208 in an SSD block set 210 composed of WEUs 214a, 214b, . . . . The WEUs 214a, 214b are accessible via index 212 using, for example, a fingerprint index. The cached data in WEUs 214a, 214b, . . . is written and read from content store 206. Frequently and recently used pages of data, e.g. Page 1, Page 2, Page 3, . . . can be stored temporarily in memory in a hot page cache 218.

In one embodiment, during operation, the content store 206 queries the segment store 204 to determine whether a requested segment is already in memory. If not, then the segment store 204 will check the index 212 to determine whether the requested segment is cached in the SSD data cache 208. If not, then the segment store 204 will obtain the requested data from containers in storage unit 202. Throughout operation the SSD data cache 208 hit counts and recency statistics are accumulated as will be described in further detail below.

Figure 3:
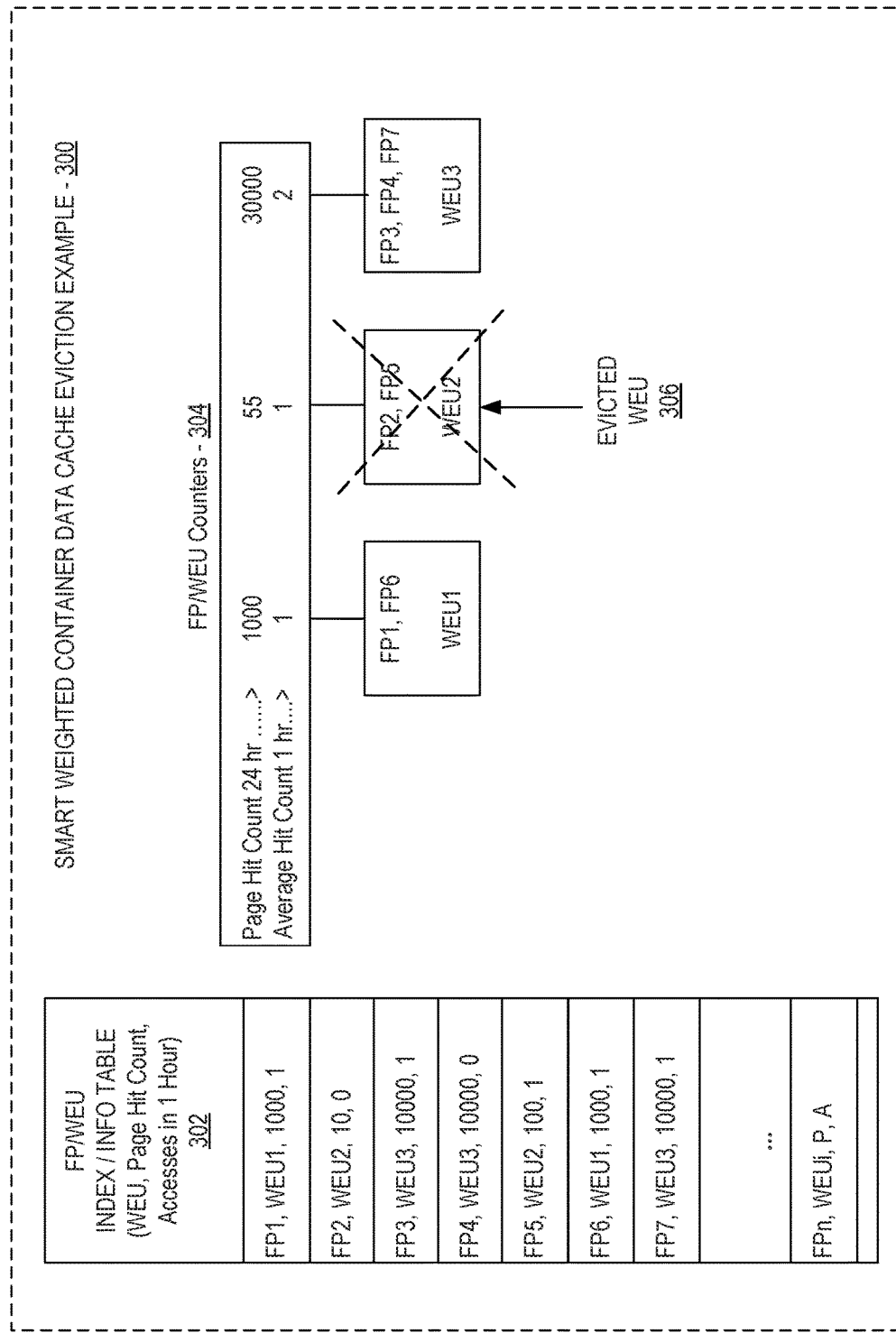
FIG. 3 is a block diagram illustrating a smart weighted container data cache eviction example according to one embodiment of the invention.

FIG. 3 is a block diagram illustrating a smart weighted container data cache eviction example 300 according to one embodiment of the invention. By way of example only, and for ease of illustration, a fingerprint (FP)/WEU index 302 maps FP1, FP2, . . . FPn identifiers of cached data blocks/pages to the respective data structures, WEU1, WEU2, . . . WEUi in which they are cached. In operation the number of cached data blocks/pages and their respective WEUs are typically vastly larger than in the illustrated example and can span one or more cache memory devices and storage units.

In one embodiment the FP/WEU index 302 can be maintained in the index 212 stored in the SSD data cache 208 (FIG. 2) along with the WEUs 214a, 214b, . . . (FIG. 2). Alternatively the FP/WEU index 302 can be separately maintained in a WEU info table stored in the SSD data cache 208 or in memory. Either way, the FP/WEU index 302 is used to accumulate the number of page hit counts and recency information (accesses within one hour) for each FP/WEU mapping during data cache operations. In one embodiment, if the page hit count and recency information can be moved to a WEU info table instead of keeping it in index 302, then the page hit count and recency information can be aggregated at the segment level for the WEUs.

In one embodiment, during data cache operation, the FP/WEU counters 304 are used to compute the page hit counts for each WEU over a 24-hour period as well as the average hit count per WEU over a 1-hour period. In one embodiment, the smart weighted data cache eviction process uses the accumulated counters 304 to list all of the WEUs sorted on average page hit counts. From that list the eviction process selects those data blocks/pages having the lowest hit counts and creates another two lists of WEUs sorted in order by how many of their data blocks/pages were not accessed during the 24-hour and 1-hour periods. From those two lists the eviction process proceeds to evict those data blocks/pages that were not accessed during the 24-hour and 1-hour periods, including evicting an entire WEU.

In the illustrated example, WEU2, containing data blocks FP2 and FP5 averaging 110 page counts and just 1 page access in the most recent 1-hour period, is selected 306 for eviction since it has the lowest average hit count and low recency.

In one embodiment, the eviction process goal is to maintain high cache hit rates (e.g. above 50%) for multiple primary-like workloads, and can adapt to different workloads. For example, some workloads are more frequency-based and others are more recency-based. The type of workload is reflected in the working set of an application. In one embodiment, the eviction policy implemented by the smart weighted container data cache eviction processes change in accordance with the workload by evicting only the least frequently and least recently used data blocks/WEUs. In this manner, the eviction process can be tuned so that evictions are completed fast enough to prevent any new allocations in the SSD data cache from blocking. For example, tuning the eviction process includes changing a lowest number of data blocks evicted in any single iteration of the eviction process (e.g. the least frequent 30K blocks), of changing how often the eviction process is triggered (e.g. once per hour, twice per day, upon allocation failure)

Figure 4:
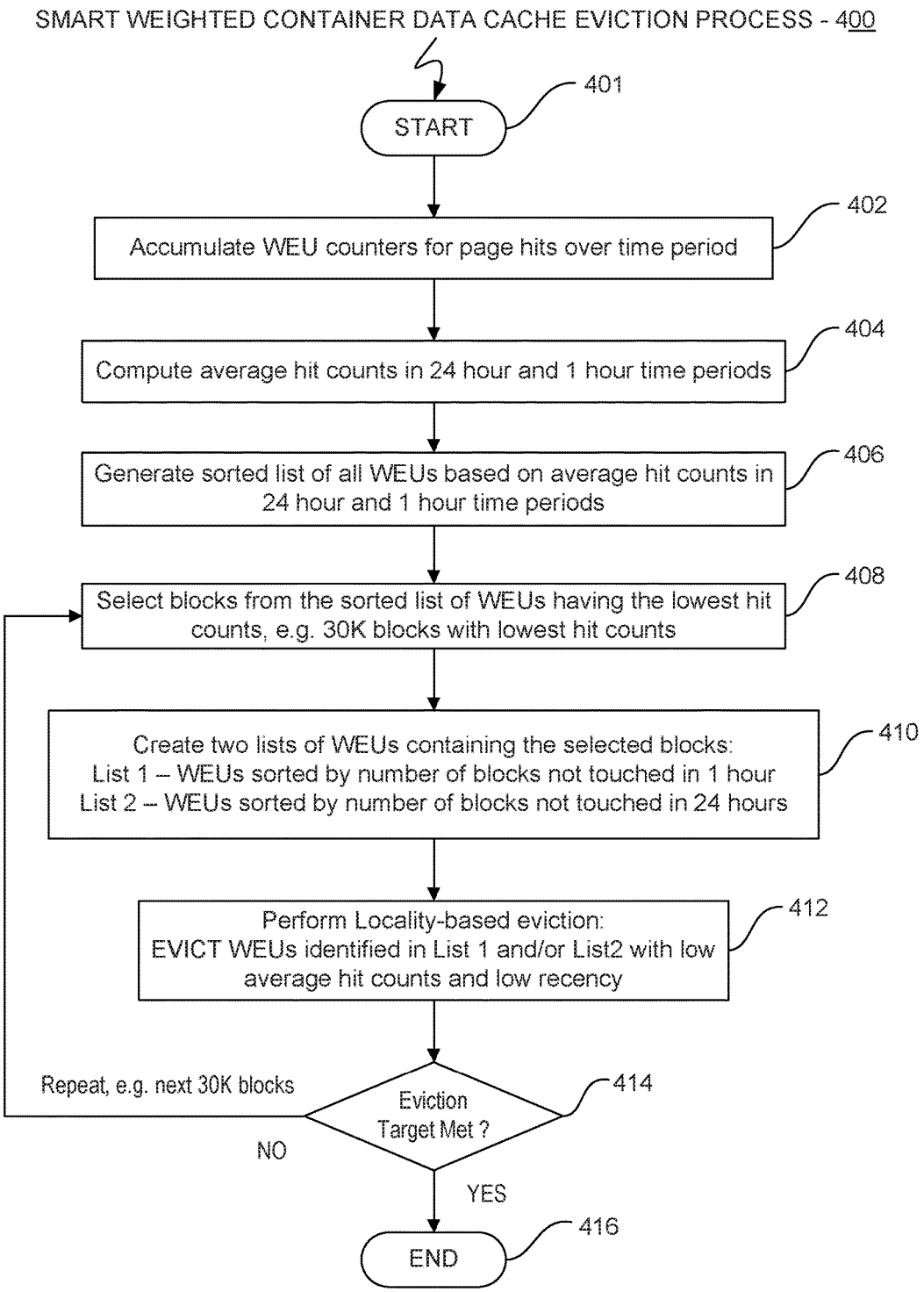
FIG. 4 is a flow diagram illustrating processes for smart weighted container data cache eviction according to one embodiment of the invention.

FIG. 4 is a flow diagram illustrating the processes 400 for smart weighted container data cache eviction in further detail according to one embodiment of the invention.

In a typical embodiment, the data cache is populated for extents of 32k. Because the extents are accessed together, evicting them together—i.e. locality-based eviction—is relatively efficient. For example, if blocks are added to a WEU temporally, and the blocks are accessed neither frequently nor recently, then the entire 1 MB WEU could be evicted.

In the described embodiment that follows, the eviction process 400 is configured to find the best blocks to evict, i.e., the least recently used and those that have low overall hit counts. In one embodiment, the process 400 adapts dynamically with workload in that more frequent access causes more eviction of older blocks and vice versa.

In a typical embodiment, the eviction process 400 walks the FP/WEU index and maps each entry to the specified WEU, and aggregates the WEU's page hit count. After computing a max/min/mean WEU hit count, the process 400 creates a list of WEUs sorted on average hit count, and, by way of example only, selects the bottom 30K WEUs with low hit count as candidates for eviction. In one embodiment, the bottom WEU selection of 30K can vary depending on the current eviction needs of the data cache. For example, in some processing environments, the bottom 100K WEUs with low hit counts can be selected as candidates for eviction in a single iteration depending on the eviction target and processor performance constraints.

In one embodiment, the process sorts the exemplary 30K eviction-candidate WEUs based on number of pages touched in the larger/smaller time periods (e.g. 24 hr/1 hr). Based on eviction needed and also the workload characteristics, the eviction process 400 evicts WEUs from either or both of the lists. For example, if there are WEUs containing zero or less than 5% pages touched in the 24 hr/1 hr time periods, and with low hit counts, they are evicted. In a typical embodiment, the eviction process 400 is repeated until the eviction target for the data cache is reached.

For example, in one embodiment, the eviction target can be to maintain 5-10% of reserved space in the data cache so that when reaching 90% space usage, the eviction process commences freeing up 10-15% space to reduce the overall cost of eviction processing. In one embodiment, the eviction process is run intermittently to lower the cost of eviction. Alternatively the eviction process is run continuously so that so every usable block of the data cache is productive, i.e. maintains a high cache hit rate.

In one embodiment, the cache eviction process is configured to retain overall average pages per WEU that were touched in 24 hr/1 hr. If the retention rate is high (e.g. above 50%) for each WEU, then the application workload is recency driven. If the retention rate is low (e.g. below 50%) for each WEU, then the application workload is frequency driven.

With reference to FIG. 4, at 402, the process 400 accumulates WEU counters for page hits over designated time periods, e.g. the 24-hour time period and the 1-hour time period. Other time periods may be employed depending on the implementation. A shorter time period, such as the 1-hour time period, is used to determine recency of access, whereas the longer time period, such as the 24-hour time period, is used to determine frequency of access.

In one embodiment, at 404, an eviction process 400 is performed periodically or on demand, and computes the average hit counts for each WEU during the longer (24-hour) time period, and during the shorter time period (1-hour). At 406 the eviction process 400 generates a sorted list of all WEUs based on the average hit counts in the longer and shorter time periods. At process 408, the cache eviction process 400 commences selecting blocks from the sorted list of WEUs having the lowest hit counts, e.g. 30K blocks with the lowest hit counts. In one embodiment, the process 400 weights the hit count adjusting for skew, where the skew is equal to a computation such as 3(mean−median)/standard deviation. In this manner the eviction process reduces the average hit count by 30% for every 1 deviation.

In one embodiment, upon completion of the selection in 408, at 410 the process 400 creates two lists of WEUs containing the selected blocks. One list contains the WEUs sorted by the number of blocks not accessed in 1 hour time period; the other list contains the WEUs sorted by the number of blocks not accessed in the 24 hour time period. In one embodiment, the lists are sorted based on the number of pages touched using the average hit count as the secondary key. At 412, the eviction process 400 performs locality-based eviction by evicting WEUs identified in the first and/or second lists as having low aver hit counts and/or low recency.

Lastly, at decision block 414, the eviction process 400 determines whether the eviction target was met. For example, for every platform there is typically a reserved block based on the incoming write bandwidth requirement. In one embodiment, an eviction target is to evict twice the reserved block amount on every eviction cycle. For instance, if the incoming write bandwidth requirement is 24 mb/s and there are 10G reserved blocks for the platform, then the eviction process 400 needs to be performed every 450 secs.

If so, then the process 400 ends, but if not, then the process 400 is reiterated beginning at 408, by selecting a next set of blocks for eviction, e.g. the next 30K blocks with the lowest hit counts. In one embodiment, if the total number of potential blocks that need to be evicted is very high, then the eviction process can be iterated over a subset of the blocks, one after the other. For instance, if there are 3M blocks, the eviction process 400 can select 100K blocks at a time to reduce the eviction time. Regardless of how many iterations or the number of blocks selected for processing in each iteration, the process 400 continues at 410, 412 and 414 until the eviction target has been met.

With reference to the foregoing eviction process 400, in one embodiment the page hit count and recency information is moved to a WEU info table instead of an FP/WEU index. In so doing the eviction process 400 is configured to consolidate segment level information at the WEU level. The eviction process 400 again walks the WEU table for the longer (24-hour) and shorter (1-hour) time periods, but resets all segments at the end of each period. The eviction process 400 further aggregates the hit counts across all segments in the WEU, calculate the skew and reduces the overall hit count by a predetermined value to reduce its importance. In one embodiment, all of the blocks can be sorted based on average hit count (skew accounted) or they can be sorted one million blocks at a time. By using a quick sort the sorting consumes roughly 100 ms of processing time so the overall eviction process is shorter than it would be otherwise.

In the foregoing description note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 5:
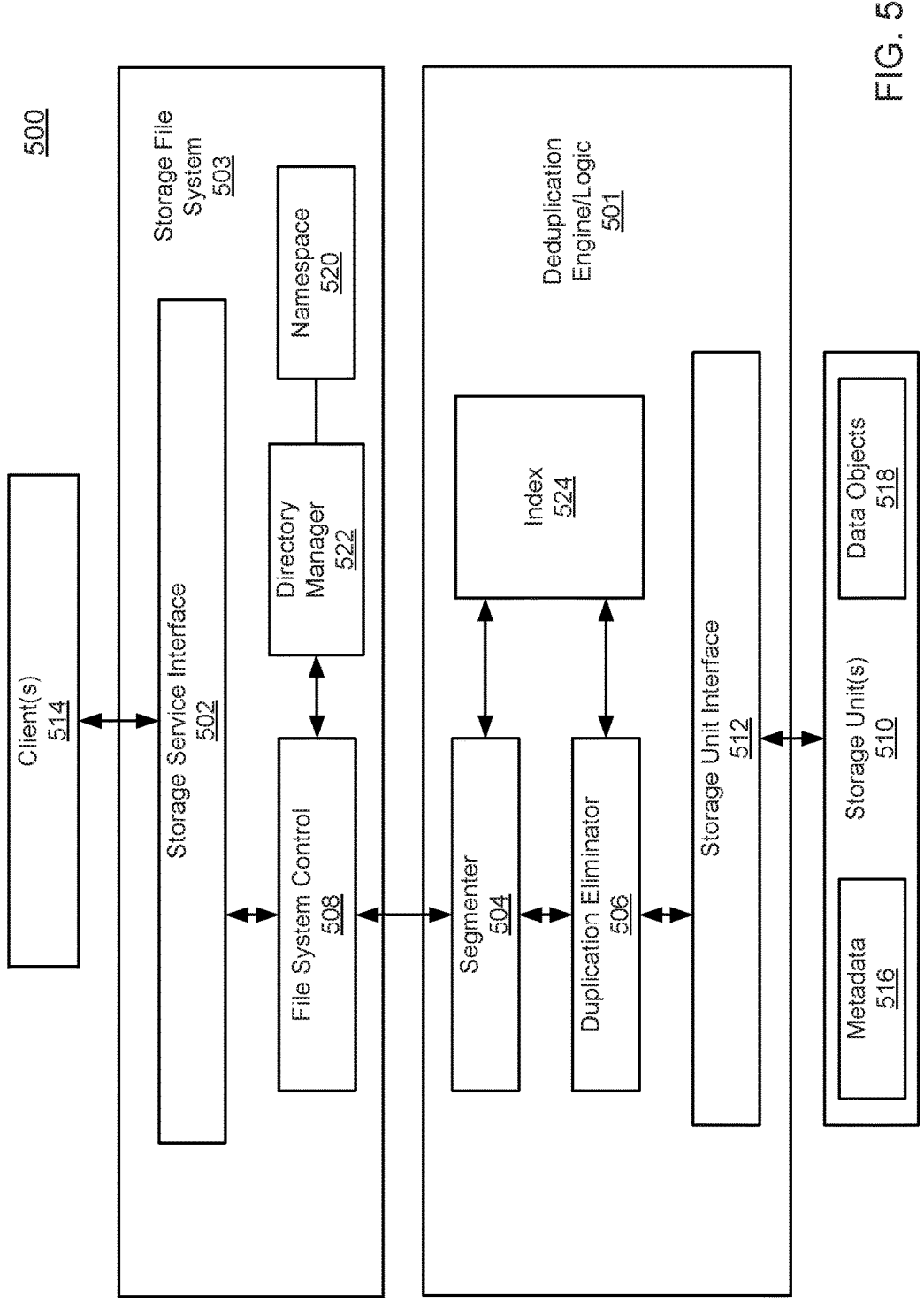
FIG. 5 is a block diagram illustrating a general example of a storage system in which cache management for data cache eviction can be implemented according to one embodiment of the invention.

FIG. 5 is a block diagram illustrating a deduplication storage system according to one embodiment of the invention. For example, deduplication storage system 500 is implemented as part of the storage system 500 as described above, such as, for example, the deduplication storage system as a client and/or a server described above. In one embodiment, storage system 500 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 500 may have a distributed architecture, or all of its components may be integrated into a single unit. Storage system 500 may be implemented as part of an archive and/or backup system, or a disaster recovery system, such as a deduplicating storage system available from EMC® Corporation of Hopkinton, Mass.

In one embodiment, storage system 500 includes deduplication logic 501 interfacing one or more clients 514, via file system 503, with one or more storage units 510 storing metadata 516 and data objects 518. Clients 514 may be any kinds of clients, such as, for example, a client application, backup software, a garbage collector, or a storage management function, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 510 may be implemented locally (e.g., single node operating environment) or remotely (e.g., multi-node operating environment) via an interconnect, which may be a bus and/or a network (e.g., a storage network). In one embodiment, one of storage units 510 operates as an active storage to receive and store external or fresh user data from a client (e.g., an end-user client or a primary storage system associated with one or more end-user clients), while the another one of storage units 510 operates as a target storage unit to periodically archive data from the active storage unit according to an archiving policy or scheme.

Storage units 510 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 510 may also be combinations of such devices. In the case of disk storage media, the storage units 510 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 516, may be stored in at least some of storage units 510, such that files can be accessed independent of another storage unit. Metadata of each storage unit includes enough information to provide access to the files it contains. In one embodiment, metadata may include fingerprints or representatives contained within data objects 518, where a data object may represent a data segment (also referred to as a data chunk), a compression region (CR) of one or more data segments, or a container of one or more CRs. Fingerprints are mapped to a particular data object via metadata 516, enabling the system to identify the location of the data object containing a data segment represented by a particular fingerprint. A fingerprint may be generated based on at least a portion of a data segment, for example, by applying a predetermined mathematical algorithm (e.g., hash function) to at least a portion of the content of the data segment. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 516 may include a file name, a storage unit identifier (ID) identifying a storage unit in which the segments associated with the file name are stored, reconstruction information for the file using the segments, and any other appropriate metadata information. Metadata 516 may further include a segment ID, a segment sketch, a hash of a segment, an encrypted hash of a segment, random data, or any other appropriate metadata. In some embodiments, metadata associated with a segment is used to identify identical and/or similar data segments. The stored metadata enables a faster identification of identical and/or similar data segments as an ID and/or sketch (e.g., a set of values characterizing the segment) do not need to be recomputed for the evaluation of a given incoming data segment.

In one embodiment, a segment ID includes one or more deterministic functions of a data segment (also referred to as a data segment), one or more hash functions of a data segment, random data, or any other appropriate data segment ID. In various embodiments, a data segment sketch includes one or more deterministic functions of a data segment, one or more hash functions of a data segment, one or more functions that return the same or similar value for the same or similar data segments (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a segment. For example, a sketch may be generated by applying one or more functions (e.g., hash functions) on a segment and a subset of the results of the functions performed on the segment (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, file system 503 includes file service interface 502, file system control logic 508, directory manager 522, and namespace 520. Deduplication logic 501 includes segmenter 504 (also referred to as a segmenting module or unit), duplication eliminator 506, and storage unit interface 512. File system control 508 receives a file or files (or data item(s)) via file service interface 502, which may be part of a file system namespace 520 of file system 503 associated with the deduplication logic 501. The file system namespace 520 refers to the way files are identified and organized in the system. An example is to organize the files hierarchically into directories or folders, which may be managed by directory manager 522. File service interface 512 supports a variety of protocols, including a network file system (NFS), a common Internet file system (CIFS), a direct access file system (DAFS), Hadoop distributed file system (HDFS), and a virtual tape library interface (VTL), etc.

The file(s) is/are processed by segmenter 504 and file system control 508. Segmenter 504, also referred to as a content store, breaks the file(s) into variable-length segments based on a variety of rules or considerations. For example, the file(s) may be broken into segments by identifying segment boundaries. Segment boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more segments that originally made up a data block, data stream, file, or directory that was/were previously stored.

In some embodiments, segments are segmented by identifying segment boundaries that are content-based, such as, for example, a hash function is applied to values of data within a sliding window through the data stream or block and when the hash function is equal to a value (or equal to one of several values) then a segment boundary is identified. In various embodiments, segment boundaries are identified using content based functions operating on a sliding window within a data stream or block that have a minimum or maximum or other value or any other appropriate content based segmenting algorithm. In various embodiments, segments include fixed-length segments, variable length segments, overlapping segments, non-overlapping segments, segments with a minimum size, segments with a maximum size, or any other appropriate segments. In various embodiments, segments include files, groups of files, directories, a portion of a file, a portion of a data stream with one or more boundaries unrelated to file and/or directory boundaries, or any other appropriate segment.

In one embodiment, a segment boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 508, also referred to as a file system manager, processes information to indicate the segment(s) association with a file. In some embodiments, a list of fingerprints is used to indicate segment(s) associated with a file. File system control 508 passes segment association information (e.g., representative data such as a fingerprint) to index 524. Index 524 is used to locate stored segments in storage units 510 via storage unit interface 512. In one embodiment, index 524 may include multiple entries, each entry corresponding one of the deduplicated segments. Each entry maps a representative or fingerprint of a deduplicated segment to a storage location identifier identifying a storage location storing the corresponding deduplicated segment. In one embodiment, each entry of index 524 maps a fingerprint of a segment to a container identifier identifying a container that contains the corresponding segment.

In one embodiment, index 524 includes a persistent hash-table of segment-IDs keyed either by the digest of the data stored in the segment or by the deduplication key of the data stored in the segment. The index 524 need not contain entries for every data segment in the deduplication domain, but the effectiveness of deduplication is a function of the number of entries stored in the index 524. Deduplication of data happens in two logically distinct operations: detection and remapping. The detection operation identifies blocks containing the same data. The remapping operation updates address maps that record physical locations of logical units of data so that a single block of data is shared by multiple logical units (LUNs) or by multiple positions within the same LUN. Detection is accomplished by building a database (e.g., index 524) that maintains a digest (e.g., SHA, checksum) and a deduplication key for each data block. When two data blocks have the same digest they have a sufficiently high probability of containing the same data to warrant a bit-for-bit comparison to confirm they are exact duplicates. Remapping leverages dynamic block-mapping technology of a file system mapping driver. A file system allows dynamic manipulation of the address maps that connects LUN's logical address space to its physical address space.

Duplication eliminator 506, also referred to as a segment store, identifies whether a newly received segment has already been stored in storage units 510. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 510 that make up the file. Segments are then packed by a container manager (which may be implemented as part of storage unit interface 512) into one or more storage containers stored in storage units 510. The deduplicated segments may be further compressed into one or more CRs using a variation of compression algorithms, such as a Lempel-Ziv algorithm before being stored. A container may contain one or more CRs and each CR may contain one or more deduplicated segments (also referred to deduplicated segments). A container may further contain the metadata such as fingerprints, sketches, type of the data segments, etc. that are associated with the data segments stored therein.

When a file is to be retrieved, file service interface 502 is configured to communicate with file system control 508 to identify appropriate segments stored in storage units 510 via storage unit interface 512. Storage unit interface 512 may be implemented as part of a container manager. File system control 508 communicates (e.g., via segmenter 504) with index 524 to locate appropriate segments stored in storage units via storage unit interface 512. Appropriate segments are retrieved from the associated containers via the container manager and are used to construct the requested file. The file is provided via interface 502 in response to the request. In one embodiment, file system control 508 utilizes a tree (e.g., a segment tree obtained from namespace 520) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

In one embodiment, storage system 500 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Note that some or all of the components as shown and described above (e.g., deduplication logic 501) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into a dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 6:
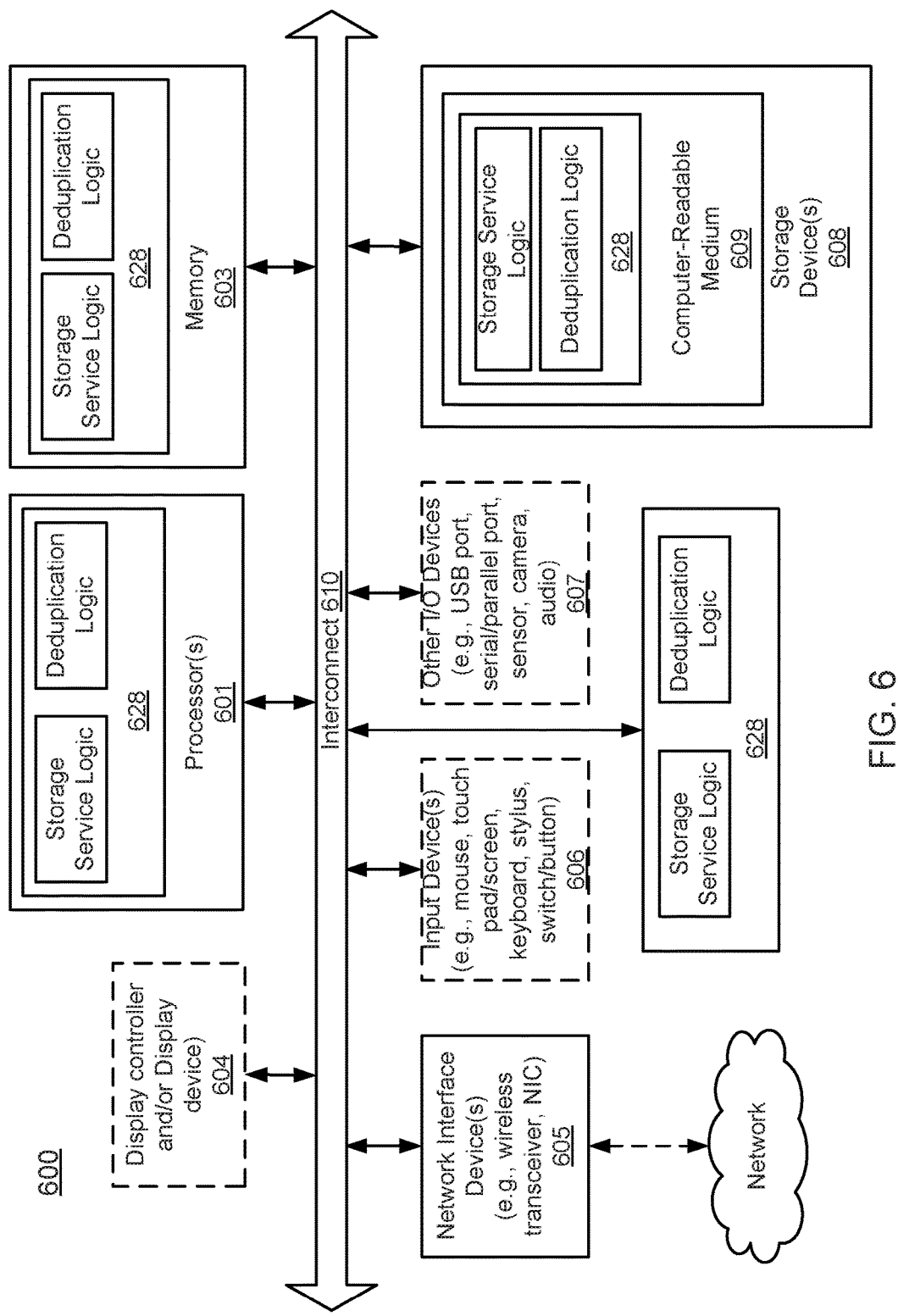
FIG. 6 is a block diagram illustrating a data processing system in which cache management for data cache eviction can be implemented according to one embodiment of the invention.

FIG. 6 is a block diagram illustrating an example of a data processing system that may be used with one embodiment of the invention. For example, system 600 may represents any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 805-808 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations and steps discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices 605-608, including network interface device(s) 605, optional input device(s) 606, and other optional IO device(s) 607. Network interface device 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with display device 604), a pointer device such as a stylus, and/or a keyboard (e.g., physical keyboard or a virtual keyboard displayed as part of a touch sensitive screen). For example, input device 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-accessible storage medium 609 (also known as a machine-readable storage medium or a computer-readable medium) on which is stored one or more sets of instructions or software (e.g., module, unit, and/or logic 628) embodying any one or more of the methodologies or functions described herein. Module/unit/logic 628 may also reside, completely or at least partially, within memory 603 and/or within processor 601 during execution thereof by data processing system 600, memory 603 and processor 601 also constituting machine-accessible storage media. Module/unit/logic 628 may further be transmitted or received over a network via network interface device 605.

Computer-readable storage medium 609 may also be used to store the some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 628, components and other features described herein can be implemented as discrete hardware components or integrated in the functionality of hardware components such as ASICS, FPGAs, DSPs or similar devices. In addition, module/unit/logic 628 can be implemented as firmware or functional circuitry within hardware devices. Further, module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing a data cache in a cache memory device, the method comprising:
    storing data in a data cache in a cache memory device, the data cache including a plurality of data structures in which a plurality of blocks of data is stored over time;
    establishing counters, for each block of data stored in each data structure, to track a frequency of access for that block in a first time period, and a recency of access for that block in a second time period, wherein the first time period is longer than the second time period;
    weighting each data structure based on the frequency of access and the frequency of access, including computing an average of a first hit count in the first time period and a second hit count in the second time period for the plurality of blocks of data stored in the data structure, and sorting the plurality of data structures based on the computed averages;
    selecting, from the plurality of sorted data structures, one or more blocks of data with a lowest computed average;
    generating a first list of data structures sorted by the recency of access of any of the one or more selected blocks of data stored in the data structures;
    generating a second list of data structures sorted by the frequency of access of any of the one or more selected blocks of data stored in the data structure; and
    evicting, from the data cache, a first data structure and a second data structure, the first data structure being in the first list of data structures and having a least recency of access of any of the one or more selected blocks of data, and the second data structure being in the second list of data structures and having a least frequency of access of any of the one or more selected blocks of data.

2. The computer-implemented method of claim 1, wherein:
    the data structures are write evict units (WEUs) in the cache memory device that each have a size determined based on an erase unit size of the cache memory device; and
    data stored in the cache memory device is erased on a per-erase unit basis according to a specification of the cache memory device.

3. The computer-implemented method of claim 1, wherein:
    the one or more blocks of data are any one of a page and a segment capable of being identified in a map associating each block of data to the data structure in which it is stored; and
    the counters established for each block of data contain cache hit counts for determining the frequency of access and the recency of access.

4. The computer-implemented method of claim 1, wherein the first time period and the second time period are both periods of time based on a number of hours over a 24-hour period of time.

5. The method of claim 1, wherein each of the first list of data structure and the second list of data structure is sorted using a quick sort algorithm.

6. The method of claim 1, further comprising:
    determining whether a predetermine eviction target has been met;
    in response to determining that the predetermined eviction target has not been met, iteratively repeating the operations to evict one or more additional data structures from the data cache until the predetermined target is met.

7. The method of claim 6, wherein the eviction target is determined to be a fixed percentage of reserved space in the data cache.

8. A storage system for caching data using a cache memory device, comprising:
    a cache memory device having a data cache in which to store a plurality of blocks of data over time, the data cache including a plurality of data structures each capable of containing some of the plurality of blocks of data; and
    a cache manager executed by a processor to:
        establish counters for each block of data stored in each data structure to track a frequency of access for that block in a first time period, and a recency of access for that block in a second time period, wherein the first time period is longer than the second time period,
        weight each data structure based on the frequency of access and the frequency of access, including computing an average of a first hit count in the first time period and a second hit count in the second time period for the blocks of data stored in the data structure, and sorting the plurality of data structures based on the computed averages,
        select, from the plurality of sorted data structures, one or more blocks of data with a lowest computed average,
        generate a first list of data structures sorted by the recency of access of any of the one or more selected blocks of data stored in the data structures,
        generate a second list of data structures sorted by the frequency of access of any of the one or more selected blocks of data stored in the data structure, and
        evict, from the data cache, a first data structure and a second data structure, the first data structure being in the first list of data structures and having a least recency of access of any of the one or more selected blocks of data, and the second data structure being in the second list of data structures and having a least frequency of access of any of the one or more selected blocks of data.

9. The storage system of claim 8, wherein:
the data structures are write evict units (WEUs) in the cache memory device that each have a size determined based on an erase unit size of the cache memory device; and
data stored in the cache memory device is erased on a per-erase unit basis according to a specification of the cache memory device.

10. The storage system of claim 8, wherein:
the one or more blocks of data are any one of a page and a segment capable of being identified in a map associating each block of data to the data structure in which it is stored; and
the counters established for each block of data contain cache hit counts for determining the frequency of access and the recency of access.

11. The storage system of claim 8, wherein the first time period and the second time period are both periods of time based on a number of hours over a 24-hour period of time.

12. The storage system of claim 8, wherein the cache manager executed by a processor is further to:
determine whether a predetermine eviction target has been met;
in response to determining that the predetermined eviction target has not been met, iteratively repeat the operations to evict one or more additional data structures from the data cache until the predetermined target is met.

13. The storage system of claim 8, wherein the eviction target is determined to be a fixed percentage of reserved space in the data cache.

14. The storage system of claim 8, wherein each of the first list of data structure and the second list of data structure is sorted using a quick sort algorithm.

15. A non-transitory computer-readable storage medium having instructions stored therein, which when executed by a processor, cause the processor to perform operations for managing a data cache in a cache memory device, the operations comprising:
storing data in a data cache in a cache memory device, the data cache including a plurality of data structures in which a plurality of blocks of data is stored over time;
establishing counters, for each block of data stored in each data structure, to track a frequency of access for that block in a first time period, and a recency of access for that block in a second time period, wherein the first time period is longer than the second time period;
weighting each data structure based on the frequency of access and the frequency of access, including computing an average: of a first hit count in the first time period and a second hit count in the second time period for the plurality of blocks of data stored in the data structure, and sorting the plurality of data structures based on the computed averages;
selecting, from the plurality of sorted data structures, one or more blocks of data with a lowest computed average;
generating a first list of data structures sorted by the recency of access of any of the one or more selected blocks of data stored in the data structures;
generating a second list of data structures sorted by the frequency of access of any of the one or more selected blocks of data stored in the data structure; and
evicting, from the data cache, a first data structure and a second data structure, the first data structure being in the first list of data structures and having a least recency of access of any of the one or more selected blocks of data, and the second data structure being in the second list of data structures and having a least frequency of access of any of the one or more selected blocks of data.

16. The non-transitory computer-readable storage medium of claim 15, wherein:
the data structures are write evict units (WEUs) in the cache memory device that each have a size determined based on an erase unit size of the cache memory device; and
data stored in the cache memory device is erased on a per-erase unit basis according to a specification of the cache memory device.

17. The non-transitory computer-readable storage medium of claim 15, wherein:
the one or more blocks of data are any one of a page and a segment capable of being identified in a map associating each block of data to the data structure in which it is stored; and
the counters established for each block of data contain cache hit counts for determining the frequency of access and the frequency of access.

18. The non-transitory computer-readable storage medium of claim 15, wherein the first time period and the second time period are both periods of time based on a number of hours over a 24-hour period of time.

19. The non-transitory computer-readable storage medium of claim 15, wherein the operations further comprise:
determining whether a predetermine eviction target has been met;
in response to determining that the predetermined eviction target has not been met, iteratively repeating the operations to evict one or more additional data structures from the data cache until the predetermined target is met.

20. The non-transitory computer-readable storage medium of claim 15, wherein the eviction target is determined to be a fixed percentage of reserved space in the data cache.

* * * * *